(12) United States Patent
Saito

(10) Patent No.: US 6,585,461 B1
(45) Date of Patent: Jul. 1, 2003

(54) METHOD OF WORKING DIFFRACTION OPTICAL GRATING ELEMENT SHAPE AND METHOD OF WORKING MOLD FOR MOLDING DIFFRACTION OPTICAL GRATING ELEMENT SHAPE

(75) Inventor: Teruo Saito, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 09/606,021

(22) Filed: Jun. 29, 2000

(30) Foreign Application Priority Data

Jul. 5, 1999 (JP) .............................. 11-190402

(51) Int. Cl.[7] .............................. B23C 1/12; B23C 3/16; B23C 3/00
(52) U.S. Cl. ...................... 409/131; 409/132; 409/305; 409/309; 409/315; 409/348
(58) Field of Search ................ 409/131, 132, 409/345, 348, 308, 309, 315, 313, 305

(56) References Cited

U.S. PATENT DOCUMENTS

| 1,715,844 | A | * | 6/1929 | Kienzl | 409/345 |
| 2,404,222 | A | * | 7/1946 | Doner | 409/304 |
| 2,618,203 | A | * | 11/1952 | Hyman | 409/315 |
| 3,277,788 | A | * | 10/1966 | Portal et al. | 409/71 |
| 3,631,758 | A | * | 1/1972 | Lasch, Jr. | 409/132 |
| 4,640,651 | A | * | 2/1987 | Runyon | 409/132 |
| 4,969,783 | A | * | 11/1990 | Ozawa et al. | 409/132 |
| 5,222,283 | A | * | 6/1993 | Laschet | 29/27 C |
| 5,838,480 | A | | 11/1998 | McIntyre et al. | |
| 5,938,381 | A | * | 8/1999 | Diehl et al. | 409/131 |
| 5,957,637 | A | * | 9/1999 | Savoie | 409/132 |

FOREIGN PATENT DOCUMENTS

| JP | 8-336701 | | 12/1996 |
| JP | 11-19815 A | * | 1/1999 |
| JP | 11-197902 A | * | 7/1999 |
| JP | 2000-326101 A | * | 11/2000 |
| WO | WO 99/12071 A1 | * | 3/1999 |
| WO | WO 99/60429 A1 | * | 11/1999 |

* cited by examiner

Primary Examiner—A. L. Wellington
Assistant Examiner—Erica E Cadugan
(74) Attorney, Agent, or Firm—Fitzpatrick, Cella, Harper & Scinto

(57) ABSTRACT

This invention aims at avoiding interference of a blade when a plurality of grooves of a diffraction grating element are formed. In order to achieve this object, in a method of working a diffraction optical grating element shape on a working target surface, a main spindle for rotatably supporting a cutting blade is provided on X-, Y-, and Z-coordinate axes of the working target surface, and an angle of an edge of the cutting blade mounted on the main spindle performs working to have an inclination with such an angle that interference with a planned working position at an outer peripheral portion of a curved surface of the diffraction optical grating element is avoided.

6 Claims, 10 Drawing Sheets

METHOD OF WORKING DIFFRACTION OPTICAL GRATING ELEMENT SHAPE AND METHOD OF WORKING MOLD FOR MOLDING DIFFRACTION OPTICAL GRATING ELEMENT SHAPE

FIELD OF THE INVENTION

The present invention relates to a method of working a diffraction optical grating element used in an image output unit, particularly a color image output unit, in an image forming apparatus, e.g., a copying machine and a printer.

The present invention also relates to a method of working a mold for molding an optical element such as a diffraction grating element.

The present invention also relates to a method of forming a groove in an optical element, particularly a diffraction grating element shape.

BACKGROUND OF THE INVENTION

An example of use of a diffraction grating element in an apparatus which line-scans a subject such as an original and reads and obtains the color image information of the subject with an image sensing element array is disclosed in, e.g., U.S. Pat. No. 5,838,480.

According to this reference, an image information beam from the subject is guided onto an image-forming substrate through an optical system on the first optical path and the first and second lens elements on the second optical path.

The first lens element has a diffraction grating element shape.

With this arrangement, the image information beam can be split into a plurality of beams having different wavelength ranges, and the plurality of beams can correctly form an image on the image-forming substrate without color misregistration.

Japanese Patent Laid-Open No. 8-336701 proposes a method of working a curved surface having an arbitrary shape with high surface precision.

FIG. 12 shows an optical scanning unit in a color image forming apparatus incorporating an optical element according to the present invention.

Referring to FIG. 12, reference numeral 1 denotes a light source means such as a semiconductor laser; 2, a collimator lens; 4, an aperture diaphragm; and 6, a cylindrical lens having a predetermined refracting power in only a subscanning direction to cause a beam passing through the aperture diaphragm 4 to form a linear image on the reflecting surface of an optical deflector 8 (to be described later) within a subscanning section.

Reference numeral 8 denotes a polygon mirror serving as the optical deflector and rotatably controlled by a driving means (not shown).

Reference numeral 10 denotes a scanning optical element with fΘ characteristics and having a refracting portion and a diffracting portion. A refracting portion 10A is a toric lens having different powers in the main scanning direction and subscanning direction. A diffracting portion 10B is comprised of an elongated diffraction optical grating element having different powers in the main scanning direction and subscanning direction.

Reference numeral 12 denotes a photosensitive drum.

Working of the optical element according to the present invention concerns the elongated diffraction optical grating element.

When seen from above, the diffraction grating used in the color image reading apparatus described above forms a combination of substantial elliptic shapes in the major- and minor-axes directions, as shown in FIG. 1.

The diffraction grating used in this example forms a plurality of concentric ellipses having fine grooves, as shown in FIGS. 3 to 5 with a section taken along the line A—A through the center in the minor-axis direction and a section taken along the line B—B through the center in the major-axis direction.

The color image reading diffraction grating is formed on the flat surface of a rectangular parallelepiped metal substrate 1 shown in FIG. 2 by using this member 1, formed long in the major-axis direction, as the mold.

FIG. 4 shows a ridge line of the grooves near the center in the A—A direction.

FIG. 5 shows a ridge line of the grooves near the center in the B—B direction.

The numerical values of the respective portions of the diffraction grating of this example are as follows.

The width of the rectangular parallelepiped 1: 9.648 mm

The length of the rectangular parallelepiped 1: 225.12mm

The material of the rectangular parallelepiped: phosphor bronze

A gap P among grooves: 0.729727 mm to 0.009882 mm

A height h1 of the inclined portions of the grooves: 0.001488 mm

A height h2 of the inclined portions of the grooves: 0.001488 mm

An inclination angle $\alpha 1$ of the grooves: 0.1168 degree

An inclination angle $\alpha 2$ of the grooves: 8.56 degree

Also, the number of grooves is 2,577.

Grooves must be formed in above number and with the above groove sizes within an area having a width W of 9.648 mm and a length of 225.12 mm of the rectangular parallelepiped.

Referring to FIG. 1, the grooves of the diffraction grating have substantially elliptic portions M in which the elliptic shapes formed by the grooves are completely closed, and substantially elliptic portions N1, . . . , and Nn in which the elliptic shapes formed by the grooves are not closed.

When the diffraction grating element shape described above is to be worked, the blade is moved on the workpiece in the X-, Y-, and Z-axis directions along the curves of the diffraction grating. Not only the blade is moved in the X-, Y-, and Z-axis directions, but is operated biaxially to match predetermined angles with respect to the X-, Y-, and Z-axes of the workpiece, thereby performing working.

The blade must be moved in the X-, Y-, and Z-axes of the workpiece, and its posture must be controlled biaxially.

To form a diffraction optical grating element shape on the upper working target surface of a workpiece W, as shown in FIG. 6, a curved surface R1 at the central portion of the diffraction grating element shape is formed on the upper surface of the workpiece W, and after that a second groove portion R2 is formed at the outer peripheral position of the curved surface R1 of the central portion. Second and third groove shapes are sequentially formed by cutting.

The concave curved surface at the central portion is formed in the following manner. As shown in FIG. 3, the edge of the blade is moved with a predetermined feed pitch in the X-axis direction to form moving traces K1, K2, K3, . . . shown in FIG. 3 with respect to the flat X-, Y-, and Z-axis coordinate planes on the working target surface of the workpiece W. In the Z-axis direction, the blade is controlled such that its cutting edge follows the shape of the curved surface of the central portion.

In this case, as shown in FIG. 6, part of the blade which forms a curved surface G1 at the central portion interferes with the worked curved surface, and a contact mark with the blade portion is formed on the worked curved surface. This impairs the optical diffraction function.

SUMMARY OF THE INVENTION

In order to solve the problems arising when working the diffraction grating element shape described above, according to the present invention, there is provided a method of working a diffraction optical grating element shape on a working target surface, characterized in that a main spindle for rotatably supporting a cutting blade is provided on X-, Y-, and Z-coordinate axes of the working target surface, and an angle of an edge of the cutting blade mounted on the main spindle performs working to have an inclination with such an angle that interference with a planned working position at an outer peripheral portion of a curved surface of the diffraction optical grating element is avoided.

According to the present invention, there is also provided a method of working a mold for molding a diffraction optical grating element shape, characterized in that a main spindle for rotatably supporting a cutting blade is provided on X-, Y-, and Z-coordinate axes of a working target surface of the mold, and an angle of an edge of the cutting blade mounted on the main spindle performs working to have an inclination with such an angle that interference with a planned working position at an outer peripheral portion of a curved surface of the diffraction optical grating element is avoided.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

The working method according to the present invention will be described with reference to FIG. 7 and drawings that follow.

Figure 7:
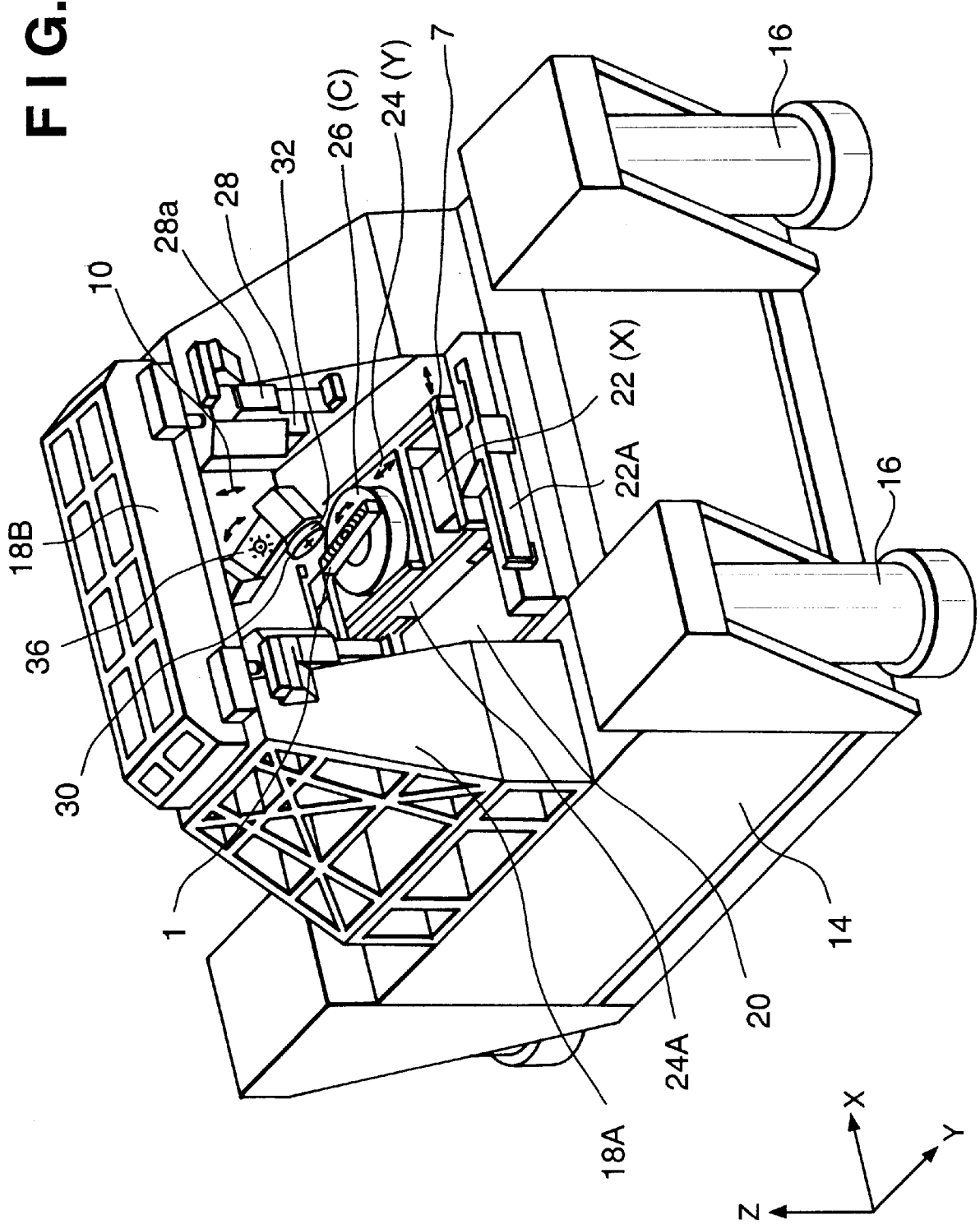
FIG. 7 is a view for explaining the arrangement of a working apparatus.

FIG. 7 shows the overall arrangement of a working apparatus, in which reference numeral 14 denotes a base table; 16, vibration absorbing means; 18A, a side surface frame; 18B, an upper surface frame; and 20, a flat table portion.

Reference numeral 22 denotes an X-axis slider slidable in the left-to-right direction on the flat table portion 20; 24, a Y-axis slider mounted on the X-axis slider 22; and 26, a C-axis rotary table.

Figure 2:
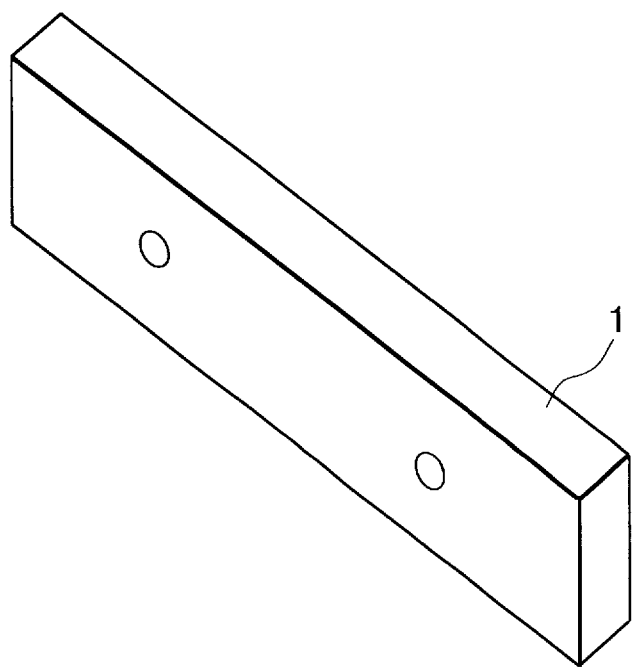
FIG. 2 is a view for explaining a rectangular parallelepiped blank which works a diffraction grating element.

A rectangular parallelepiped 1 as the workpiece shown in FIG. 2 is fixed on the C-axis rotary table 26.

The X-axis slider 22 is controlled by an X-axis linear motor means 22A which performs motion control in the X-axis direction.

The Y-axis slider 24 is controlled by a Y-axis linear motor means 24A.

Reference numeral 28 denotes a Z-axis frame standing vertically upright on the flat table portion 20.

Reference numeral 30 denotes a holding means for holding a cutting blade 32 of a working means and mounted on a main spindle 34.

The main spindle 34 is mounted on the Z-axis frame 28 through a frame 36.

The center line of the main spindle 34 will be referred to as a B-axis, and the rotating axis of the frame 36 will be referred to as a C-axis.

Reference numeral 28a denotes a Z-axis linear motor for controlling movement of the Z-axis frame 28.

Figure 8:
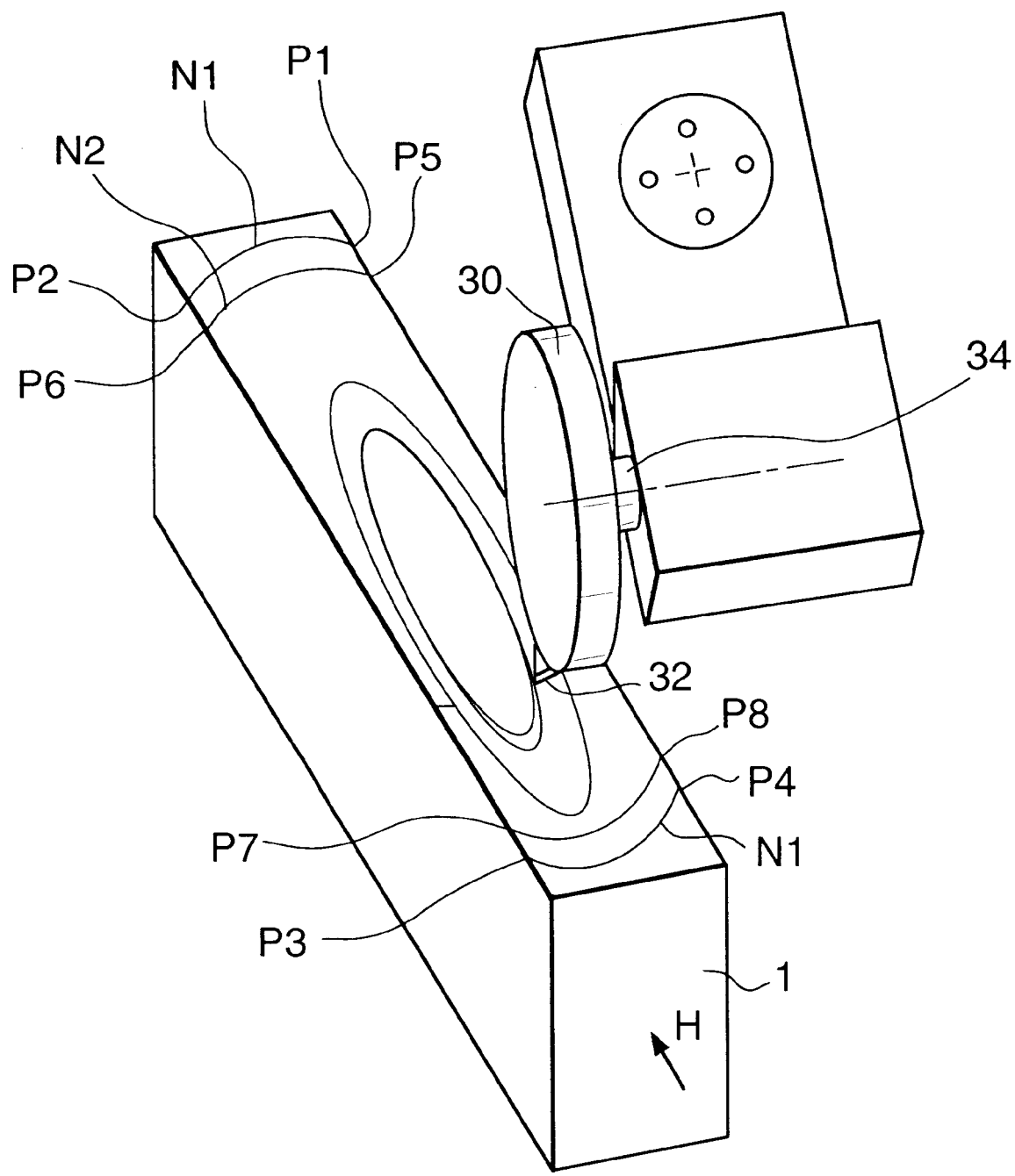
FIG. 8 is a view for explaining a working state.

FIG. 8 shows the positional relationship among the working holding means 30, the cutting blade 32, and the rectangular parallelepiped 1 as the workpiece.

Figure 9:
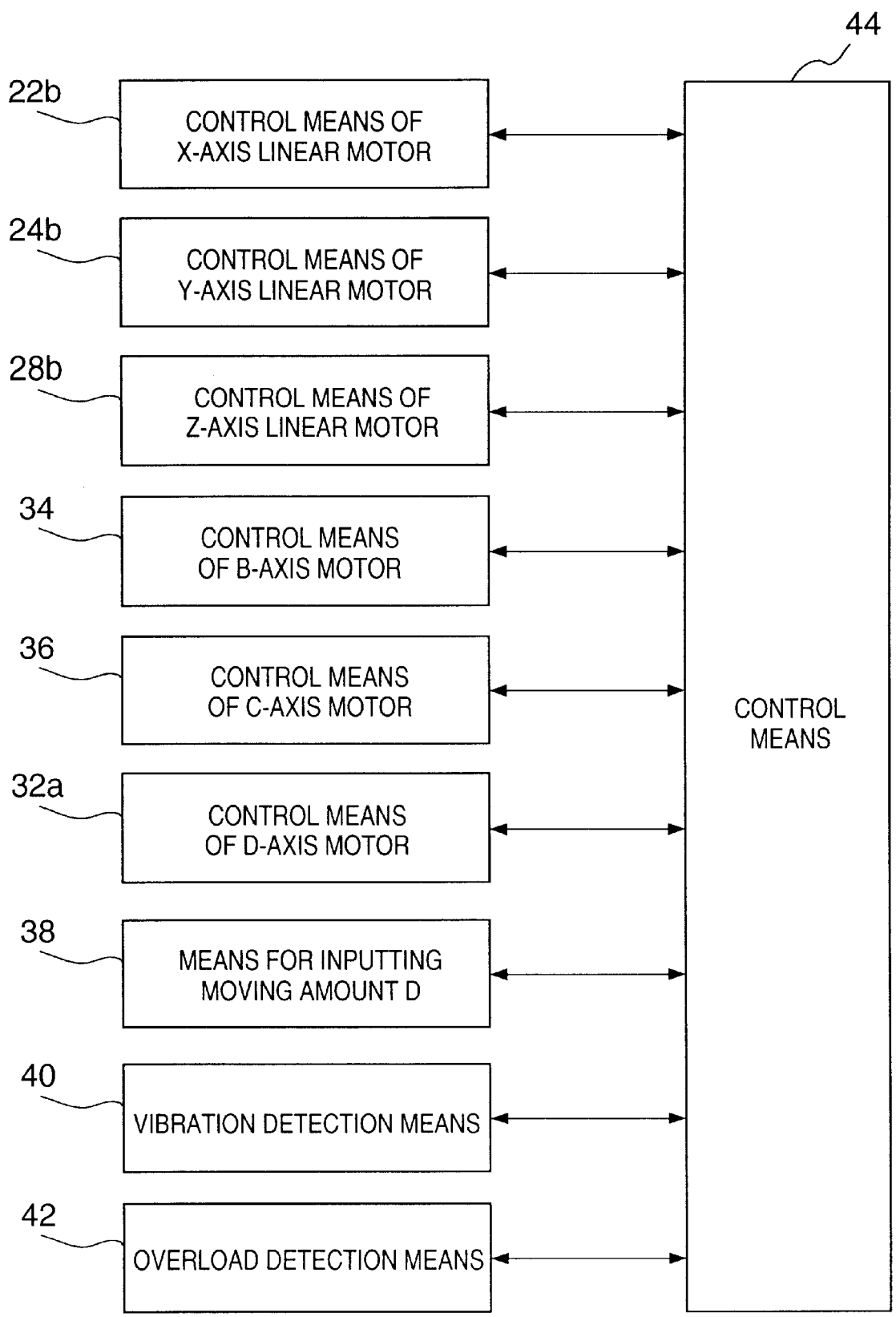
FIG. 9 is a control block diagram.

FIG. 9 is a control block diagram of the apparatus, and is constituted by movement control means of the respective axes, i.e., the X (22b)-, Y (24b)-, Z (28b)-, B (34)-, and C (36)-axes and the axis of the cutting blade 32 (32a), a means 38 for inputting the moving trace of the blade from outside, a vibration detection means 40, an overload detection means 42, an overall control means 44, and the like.

Concerning the shape of the diffraction grating element, its main scanning direction is expressed by a phase function of up to sixth degree and its subscanning direction is expressed by a second-degree phase function which differs depending on the position in the main scanning direction. The diffraction surface is expressed by relation (1):

$$\phi = -mk\lambda = b2Y^2 + b4Y^4 + b6Y^6 + (d0 + d1Y + d2Y^2 + d3Y^3 + d4Y^4)X^2 \quad (1)$$

where $\phi$ is a phase coefficient, k is the degree of diffraction, $\lambda$ is an employed wavelength, Y is a height from the lens optical axis, b2, b4, b6, d0, d1, d2, and d4 are phase coefficients, m is an integer of 1, 2, 3, . . . , or 2577, and Z is an axis perpendicularly intersecting a plane formed by the lens optical axis and the Y axis.

Design Data on Diffraction Grating Element

Employed wavelength $\lambda$ (nm): 780

Refractive index nd of elongated diffraction grating element: 1.5242

Central thickness d2 of elongated diffraction grating element: 3.0

Scanning target surface sk of elongated diffraction grating element: 110.0

Degree of diffraction K: 1.0

Phase function of elongated diffraction grating element:

| First surface | Second surface |
|---|---|
| b2 | −2.50725E−04 |
| b4 | −4.31479E−08 |
| b6 | 1.23655E−12 |
| d0 | −5.78930E−03 |
| d1 | −9.57598E−07 |
| d2 | 1.15549E−07 |
| d3 | 3.71159E−11 |
| d4 | 1.23655E−12 |

Figure 10:
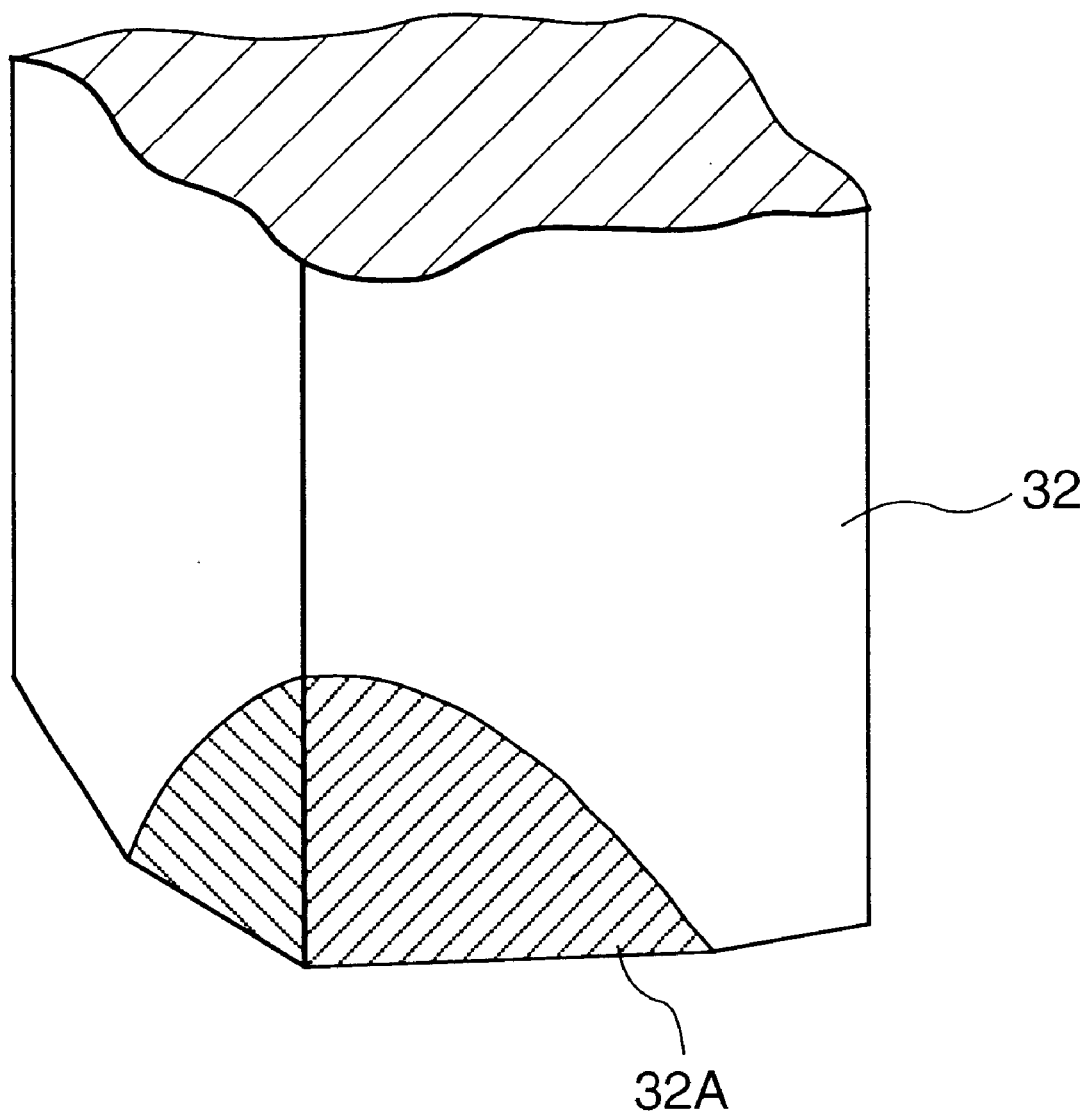
FIG. 10 is a view for explaining a blade.
Figure 11:
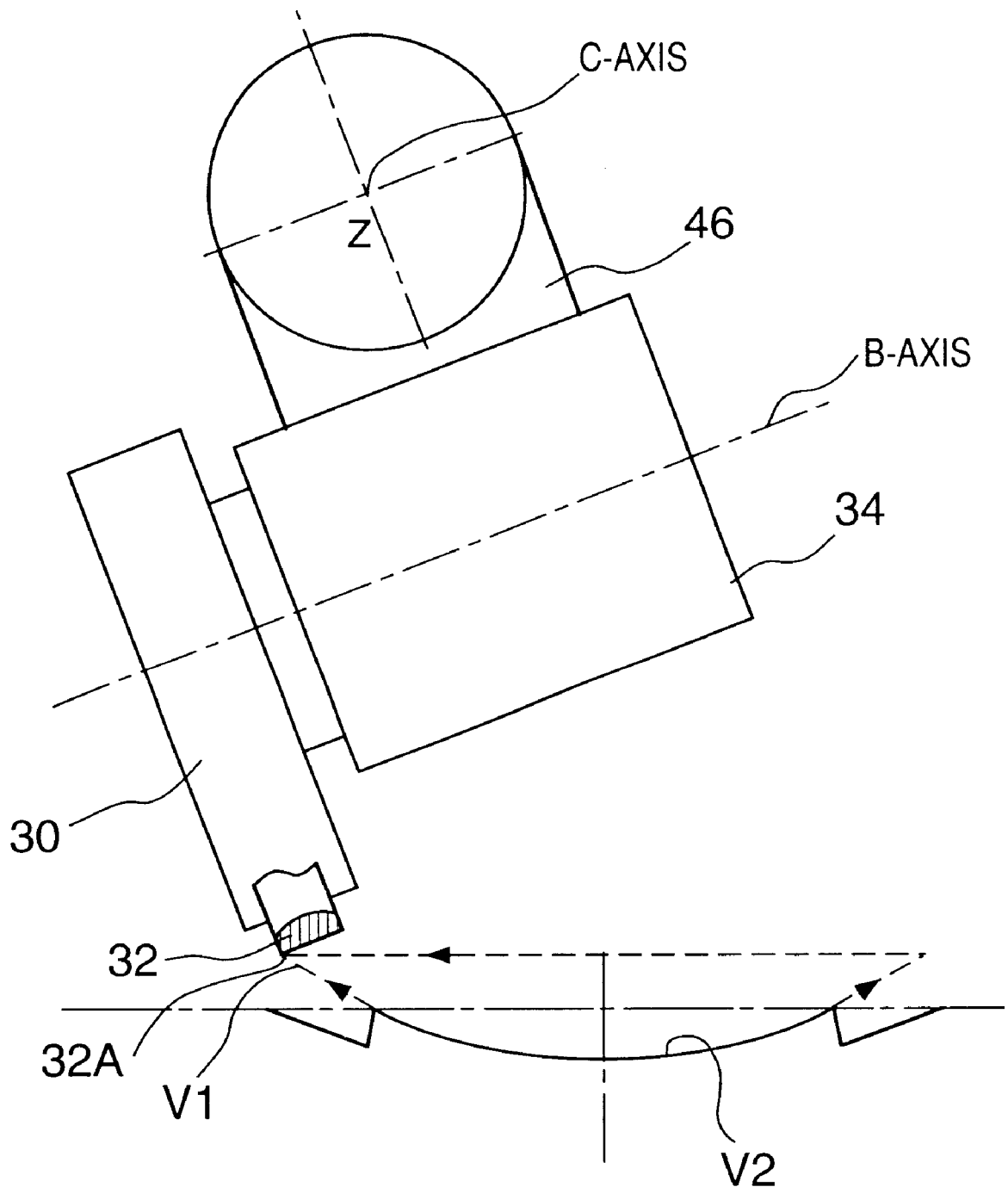
FIG. 11 is a view for explaining the function of inclination of the blade.
Figure 12:
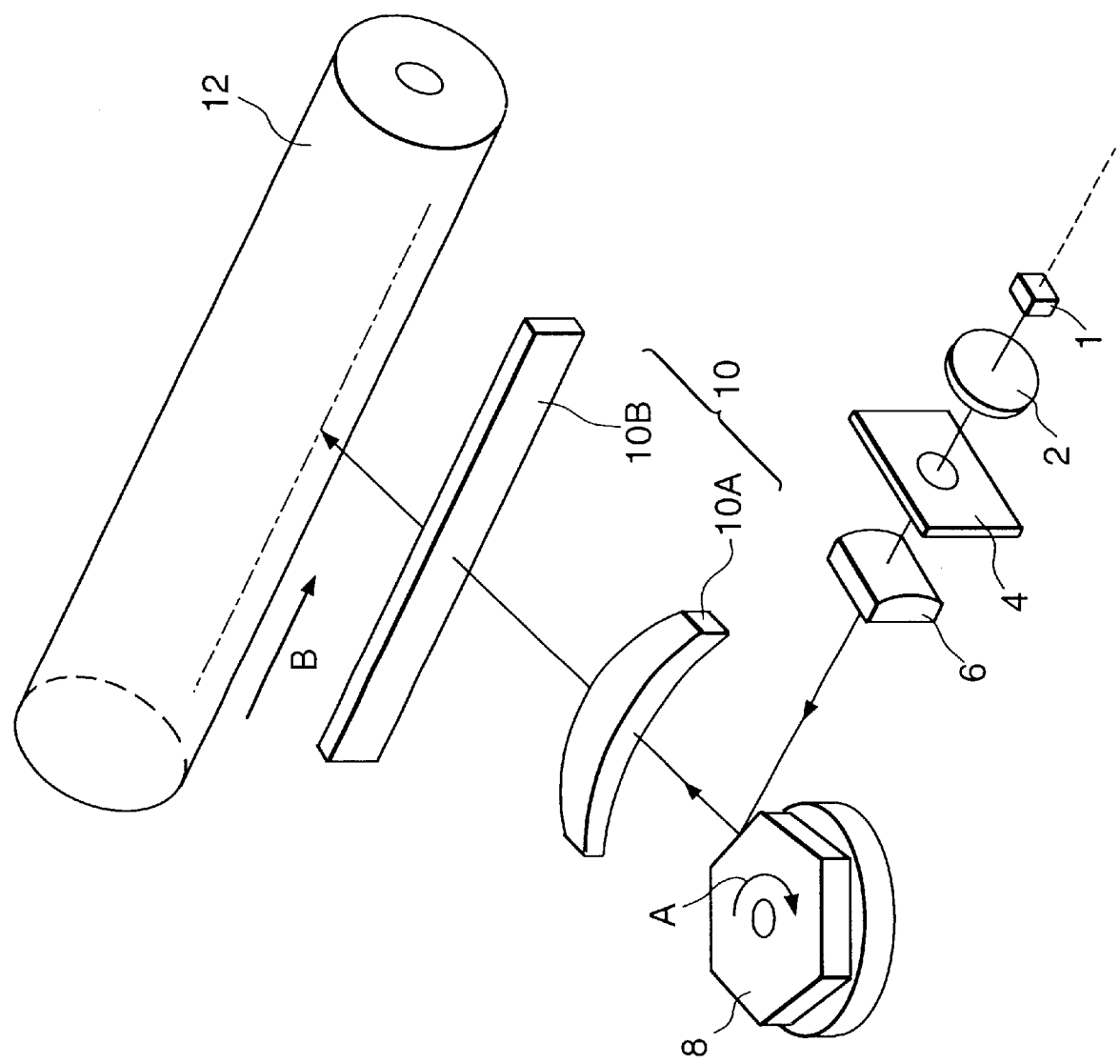
FIG. 12 is a view for explaining the optical scanning system of a color image forming apparatus.

FIG. 10 is a partially enlarged view of the distal end of the rotary cutting blade 32, and FIG. 11 is a view for explaining a state, seen from a direction H of FIG. 8, wherein the working target surface of the rectangular parallelepiped 1 as the workpiece is to be worked by the rotary cutting blade 32.

The working method according to the present invention will be described hereinafter.

The cutting blade 32 is aligned with an origin position P1 (X0, Y0, Z0, BO, Co) where working for the rectangular parallelepiped 1 is to be started.

This alignment is performed by inputting movement data from a calculation file in advance and by driving the X-, Y-, Z-, B-, and C-axis linear motor control means on the basis of the input information.

Figure 1:
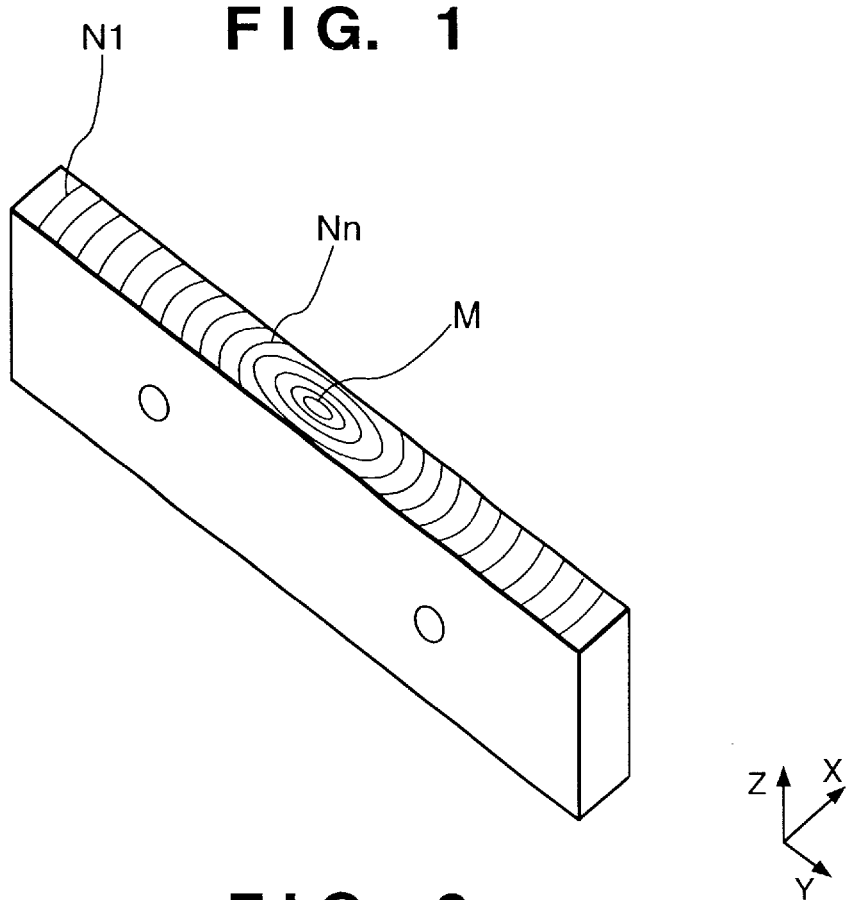
FIG. 1 is a view for explaining a diffraction grating element.

Referring to FIG. 1, the planned working target positions for closed elliptic grooves M on the central side are determined on the planned working target flat surface of the rectangular parallelepiped 1 in the order of M1, M2, M3, . . . from the central side, and the planned working target positions for non-closed elliptic grooves on the outer side are determined in the order of N1, N2, N3, . . . from the outer side.

FIG. 8 shows the working start point P1 and working end point P2 of the outermost non-closed elliptic groove shape N1, and a working start point P3 and working end point P4 that are opposite to them with respect to the optical axis of the diffraction grating element surface as the center.

As the positions of the respective grooves, their X-, Y-, and Z-axis coordinate addresses on the flat surface of the rectangular parallelepiped 1 are determined in the control means.

Groove working of the diffraction grating element by the cutting blade 32 is started from the outermost groove N1 of the elliptic grooves shown in FIG. 1.

The cutting blade 32 is aligned with the origin position P1. After that, working is performed by moving the cutting blade 32 along the planned working trace on the diffraction grating curve N1 of relation (1) in the X-, Y-, Z-, B-, and C-axes with the control unit shown in FIG. 9.

Working is performed until the cutting blade 32 reaches the working end point P2 on the other end of the rectangular parallelepiped 1.

The working speed of the cutting blade 32 from P1 to P2 is 5.0 mm/sec.

When the cutting blade 32 reaches the position P2, it then moves to the working start point P3, which is opposite to the position P2 with respect to the central axis of the diffraction surface, in the X-, Y-, C-axes.

After having moved to P3, the cutting blade 32 moves along the curve of relation (1) at the same working speed as before to perform working until the position of the working end point P4.

After reaching the position P4, the cutting blade 32 moves to a position P5 of the next diffraction groove N2 in the X-, Y-, Z-, B-, and C-axes.

FIG. 10 is an enlarged view of the main part of the blade portion of the cutting blade 32 used in this working. A tip blade edge 32A made of diamond is fixed to the holding member 32 by brazing.

FIG. 11 is a view for explaining the postures during movement of the cutting blade of the apparatus having the arrangement shown in FIGS. 7 and 8 for working the curved shape of the diffraction grating, and of the rectangular parallelepiped workpiece.

The workpiece 1 fixed to and supported on the Y-axis slider 24 shown in FIG. 7 is rotated on the rotary table 26 clockwise through an angle of Θ degree to move from the position indicated by a solid one to the position indicated by a broken line shown in FIG. 11.

While the workpiece is rotated, the blade 32 moves from the first position P1 to the second position P2 to form a groove of the diffraction grating curve between the positions P1 and P2.

In this case, the posture of the blade 32 must be controlled to follow the curve of the diffraction grating in accordance with the rotary movement of the workpiece.

Figure 6:
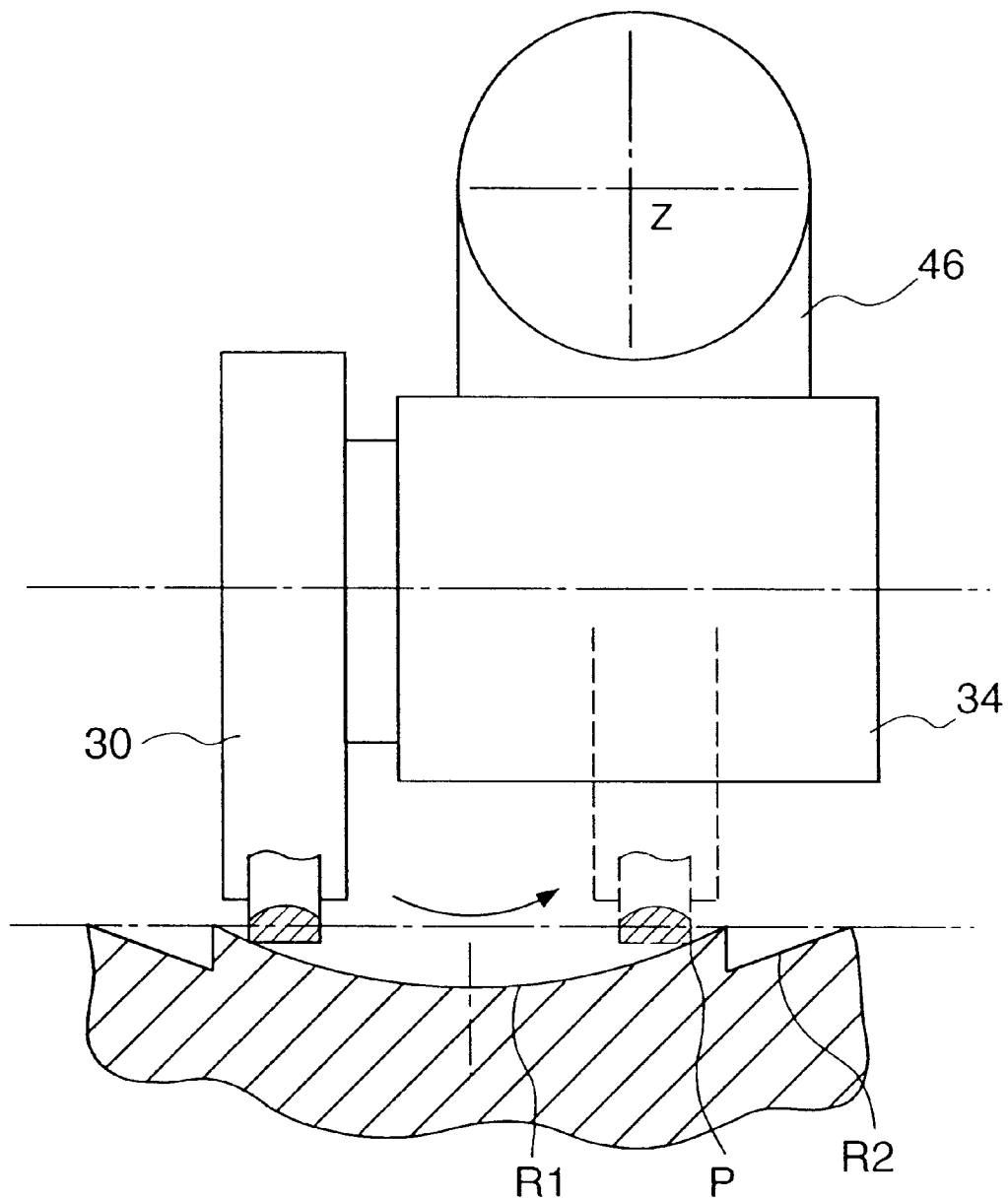
FIG. 6 is a view for explaining a working state.

In this embodiment, in the initial state shown in FIG. 6, the B-axis is parallel to the plane formed by the X- and Y-axes of the working target surface, and the C-axis perpendicularly intersects the B-axis. The blade portion 32A at the edge is also parallel to the plane formed by the X- and Y-axes of the working target surface.

Figure 3:
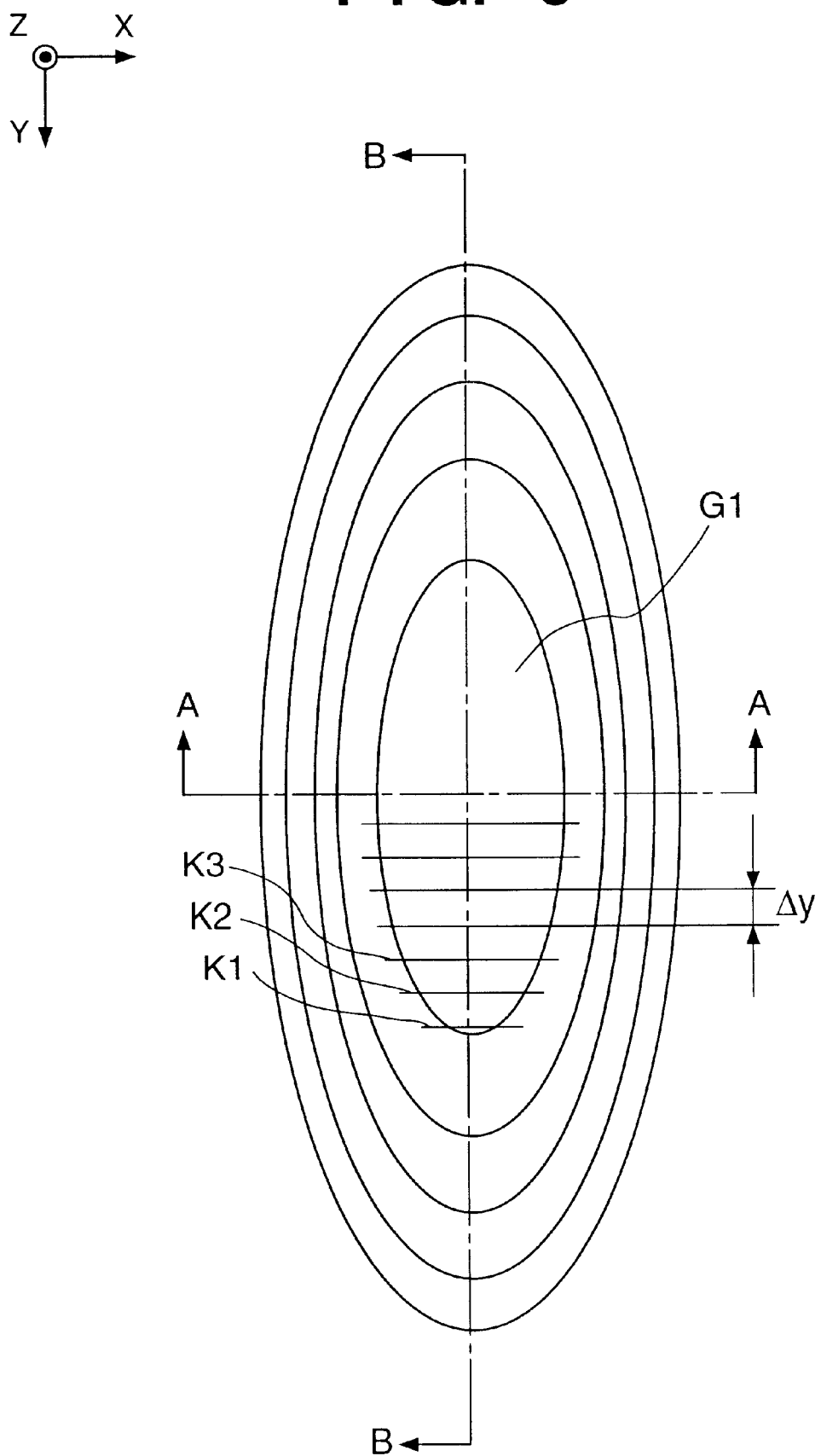
FIG. 3 is a view for explaining how the groove shapes of the diffraction grating are formed.
Figure 4:
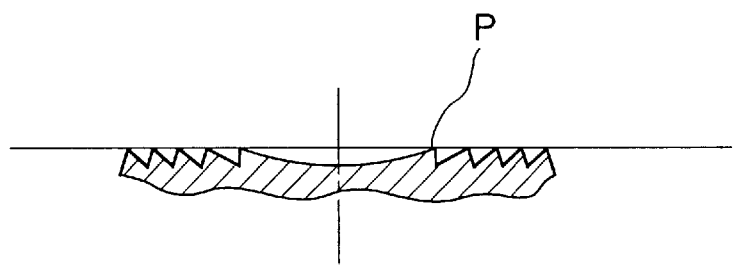
FIG. 4 is a view for explaining the shapes of the grooves in a section taken along the line A—A.
Figure 5:
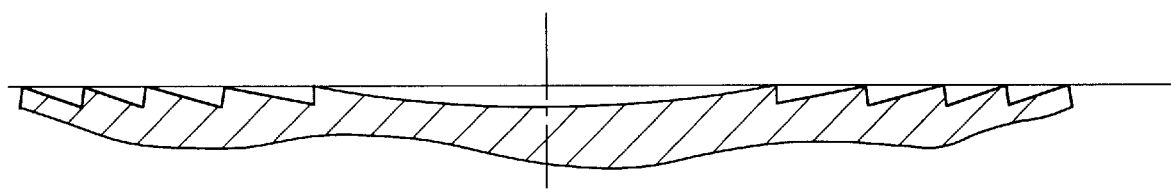
FIG. 5 is a view for explaining the shapes of the grooves in a section taken along the line B—B.

When the respective axes are operated so that the angle of the blade edge 32A forms the working trace K1 of the central recess G1 shown in FIG. 3, working is performed such that the blade edge 32A has an inclination with an angle of 1 degree by considering an angle of 30 minutes from the initial state and an error range of 30 minutes produced by working.

By operating this inclination, as shown in FIG. 11, the blade edge 32A works from a broken line V1 to a working trace V2 of the working target surface, thereby avoiding interference near the working end position.

As described above, the present invention provides a method of working a diffraction optical grating element shape on a working target surface, characterized in that a main spindle for rotatably supporting a cutting blade is provided on X-, Y-, and Z-coordinate axes of the working target surface, and an angle of an edge of the cutting blade mounted on the main spindle performs working to have an inclination with such an angle that interference with a planned working position at an outer peripheral portion of a curved surface of the diffraction optical grating element is avoided. As a result, the diffraction grating element and the like can be finely worked.

Furthermore, the present invention also provides a method of working a mold for molding a diffraction optical grating element shape, characterized in that a main spindle for rotatably supporting a cutting blade is provided on X-, Y-, and Z-coordinate axes of a working target surface of the mold, and an angle of an edge of the cutting blade mounted on the main spindle performs working to have an inclination with such an angle that interference with a planned working position at an outer peripheral portion of a curved surface of the diffraction optical grating element is avoided. As a result, a diffraction grating element having a fine shape can be molded.

The present invention is not limited to the above embodiments and various changes and modifications can be made within the spirit and scope of the present invention.

Therefore, to apprise the public of the scope of the present invention the following claims are made.

What is claimed is:

1. A method of working a diffraction optical grating element onto a working target surface, wherein a main spindle for rotatably supporting a cutting blade is movable along X-, Y-, and Z-coordinate axes of the working target surface, and an edge of the cutting blade mounted on the main spindle performs working of elliptic grooves by moving the cutting edge in an elliptic orbit at an angle of inclination with respect to a plane substantially perpendicular to the optical axis of said diffraction optical grating element such that the cutting blade does not interfere with a planned position of a worked elliptic groove of the diffraction optical grating element at an outer peripheral portion of a curved surface of the diffraction optical grating element formed by the working of the cutting edge.

2. The method according to claim 1, wherein the angle of the inclination is set by considering an error range produced by the working.

3. The method according to claim 1, wherein a center line of the main spindle is inclined with respect to a plane defined by the X- and Y-coordinate axes of the working target surface to provide the angle of inclination of the edge of the cutting blade.

4. A method of working a mold for molding a diffraction optical grating element, wherein a main spindle for rotatably supporting a cutting blade is movable along X-, Y-, and Z-coordinate axes of a working target surface of the mold, and an edge of the cutting blade mounted on the main spindle performs working of elliptic grooves by moving the cutting edge in an elliptic orbit at an angle of inclination with respect to a plane substantially perpendicular to the optical axis of said diffraction optical grating element such that the cutting blade does not interfere with a planned position corresponding to an elliptic groove of the diffraction optical grating element at an outer peripheral portion of a curved surface of the diffraction optical grating element formed by the working of the cutting edge.

5. A method according to claim 4, wherein the angle of the inclination is set by considering an error range produced by the working.

6. A method according to claim 4, wherein the main spindle is inclined relative to a plane formed perpendicular to the plane formed by the X- and Y-coordinate axes so the edge has the inclination with respect to the plane substantially perpendicular to the optical axis.

* * * * *